(12) United States Patent
Flynt et al.

(10) Patent No.: US 8,130,193 B2
(45) Date of Patent: Mar. 6, 2012

(54) SYSTEM AND METHOD FOR EYES-FREE INTERACTION WITH A COMPUTING DEVICE THROUGH ENVIRONMENTAL AWARENESS

(75) Inventors: David Wayne Flynt, Lake Forest Park, WA (US); Timothy Lawrence Brooke, Kirkland, WA (US); Peter Chin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 11/097,870

(22) Filed: Mar. 31, 2005

(65) Prior Publication Data

US 2006/0221051 A1    Oct. 5, 2006

(51) Int. Cl.
*G09G 5/00* (2006.01)
(52) U.S. Cl. ................................ 345/156; 351/200
(58) Field of Classification Search .............. 345/156, 345/175, 690
See application file for complete search history.

(56) References Cited

U.S. PATENT DOCUMENTS 6,201,554 B1 * 3/2001 Lands ........................ 345/169
(Continued)

FOREIGN PATENT DOCUMENTS

JP         09-244781          9/1997
(Continued)

OTHER PUBLICATIONS

Office Action mailed Feb. 25, 2011, in Japanese Pat. Appl. No. 2006-053073, w/Translation .

(Continued)

*Primary Examiner* — Kevin M Nguyen
(74) *Attorney, Agent, or Firm* — Merchant & Gould, P.C.

(57) ABSTRACT

A system and method for eyes-free interaction with a computing device through environmental awareness. A smart computing device includes non-environmental impact settings that indicate what type of user impact will be recognized as an input. The smart computing device monitors environmental conditions to distinguish a user impact from an environmental impact. Upon detecting a user impact, a command is generated to perform a function on an application.

20 Claims, 4 Drawing Sheets

U.S. PATENT DOCUMENTS

| | | | |
|---|---|---|---|
| 6,208,996 B1 | 3/2001 | Ben-Shachar et al. | 707/104 |
| 6,370,566 B2 | 4/2002 | Discolo et al. | 709/206 |
| 6,618,716 B1 | 9/2003 | Horvitz | 706/55 |
| 6,762,741 B2 * | 7/2004 | Weindorf | 345/102 |
| 7,002,557 B2 * | 2/2006 | Iizuka et al. | 345/173 |
| 7,469,155 B2 | 12/2008 | Chu | 455/567 |
| 2002/0116530 A1 | 8/2002 | Burgess | 709/246 |
| 2002/0116541 A1 | 8/2002 | Parker et al. | 709/318 |
| 2003/0120737 A1 | 6/2003 | Lytle et al. | 709/206 |
| 2003/0225732 A1 | 12/2003 | Chan et al. | 707/1 |
| 2004/0093380 A1 * | 5/2004 | Sellen et al. | 709/204 |
| 2004/0127198 A1 | 7/2004 | Roskind et al. | 455/412.2 |
| 2004/0259536 A1 | 12/2004 | Keskar et al. | 455/418 |
| 2005/0075116 A1 | 4/2005 | Laird et al. | 455/456.3 |
| 2005/0134194 A1 * | 6/2005 | Murata | 315/221 |
| 2005/0153747 A1 | 7/2005 | Egami et al. | 455/567 |
| 2006/0017692 A1 * | 1/2006 | Wehrenberg et al. | 345/156 |
| 2006/0223547 A1 | 10/2006 | Chin et al. | 455/456.1 |
| 2008/0305746 A1 | 12/2008 | Griffin et al. | 455/67.11 |

FOREIGN PATENT DOCUMENTS

| | | |
|---|---|---|
| JP | 11-039093 | 2/1999 |
| JP | 2002-330210 | 11/2002 |
| JP | 2004-212641 | 7/2004 |

OTHER PUBLICATIONS

Office Action mailed Aug. 2, 6006, in U.S. Appl. No. 11/096,616.
Office Action mailed Jan. 19, 2007, in U.S. Appl. No. 11/096,616.
Office Action mailed Sep. 17, 2007, in U.S. Appl. No. 11/096,616.
Office Action mailed Jun. 5, 2008, in U.S. Appl. No. 11/096,616.
Office Action mailed Feb. 19, 2009, in U.S. Appl. No. 11/096,616.
Office Action mailed Sep. 16, 2009, in U.S. Appl. No. 11/096,616.
Office Action mailed Apr. 8, 2010, in U.S. Appl. No. 11/096,616.
Office Action mailed Sep. 29, 2010, in U.S. Appl. No. 11/096,616.
Amendment filed Nov. 2, 2006, in U.S. Appl. No. 11/096,616.
Amendment filed Jun. 19, 2007, in U.S. Appl. No. 11/096,616.
Amendment filed Feb. 19, 2008, in U.S. Appl. No. 11/096,616.
Amendment filed Dec. 4, 2008, in U.S. Appl. No. 11/096,616.
Amendment filed Jun. 19, 2009, in U.S. Appl. No. 11/096,616.
Amendment filed Mar. 16, 2010, in U.S. Appl. No. 11/096,616.
Amendment filed Jul. 6, 2010, in U.S. Appl. No. 11/096,616.
Communication dated Aug. 25, 2009, of Office Action in Mexican Pat. Appl. No. PA/a/2006/002335.
Office Action mailed Dec. 12, 2008, in Chinese Pat. Appl. No. 200610051546.5, w/Translation.
Office Action mailed Aug. 7, 2009, in Chinese Pat. Appl. No. 200610051546.5,w/Translation.
Office Action mailed Jan. 29, 2010, in Chinese Pat. Appl. No. 200610051546.5, w/Translation.

* cited by examiner

SYSTEM AND METHOD FOR EYES-FREE INTERACTION WITH A COMPUTING DEVICE THROUGH ENVIRONMENTAL AWARENESS

BACKGROUND OF THE INVENTION

Cellular telephones, personal computers, mobile computers, music devices and other computing devices are fast becoming mainstream modes of personal enjoyment and communication. These devices may be used while driving a vehicle, jogging, riding a bicycle, in a meeting, in a movie or during various other activities. As these modes of communication become more prevalent, so does the need for efficiency, simplicity and usability of these devices.

Current computing devices are not concerned with the devices surrounding environment. Such devices typically execute in the same manner regardless of the surrounding environment. Typically, in order to control the execution or functionality of these devices a user must navigate elements of the device itself. Such navigation and environmental obliviousness makes current computing devices inefficient, complex and decreases the usability of these devices.

SUMMARY OF THE INVENTION

Aspects of the present invention relate to a system and method for eyes-free interaction with a computing device through environmental awareness. Environmental impact settings are provided to indicate what type of impact (i.e. a single tap, double tap, triple tap, a movement, etc.) will identify an input. The computing device monitors environmental conditions in order to distinguish environmental impacts from an input. The environment may be monitored through an accelerometer, location sensor, conductance sensor, audio sensor or light sensor. When a user input is detected, a command is generated and executed on an application. For example, while riding a bicycle, an accelerometer determines that the impacts from the activity are not user inputs. However, upon the user tapping the device, the device may perform a function.

In other aspects of the present invention, other sensors give context to the environmental impact settings. The environmental impact settings may provide different impact settings depending on the current environmental condition. When the sensors detect an environmental condition, the environmental impact settings will utilize this information to determine what type of impact will indicate an input. In this manner, a user may control a computing device through impacts and not be required to look at the device while doing so. These and other aspects of the present invention will be evident in light of the disclosure set forth below.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Embodiments of a System and Method For Eyes-Free Interaction with a Computing Device Through Environmental Awareness Succinctly stated, aspects of the present invention include a system and method for eyes-free interaction with a computing device through environmental awareness. Aspects of the present invention also include monitoring environmental conditions in order to distinguish a non-environmental impact (e.g. user impact) from environmental conditions. Environmental conditions may give context to non-environmental impacts. In general, a non-environmental impact may perform different functions depending on the current environmental condition.

Figure 3:
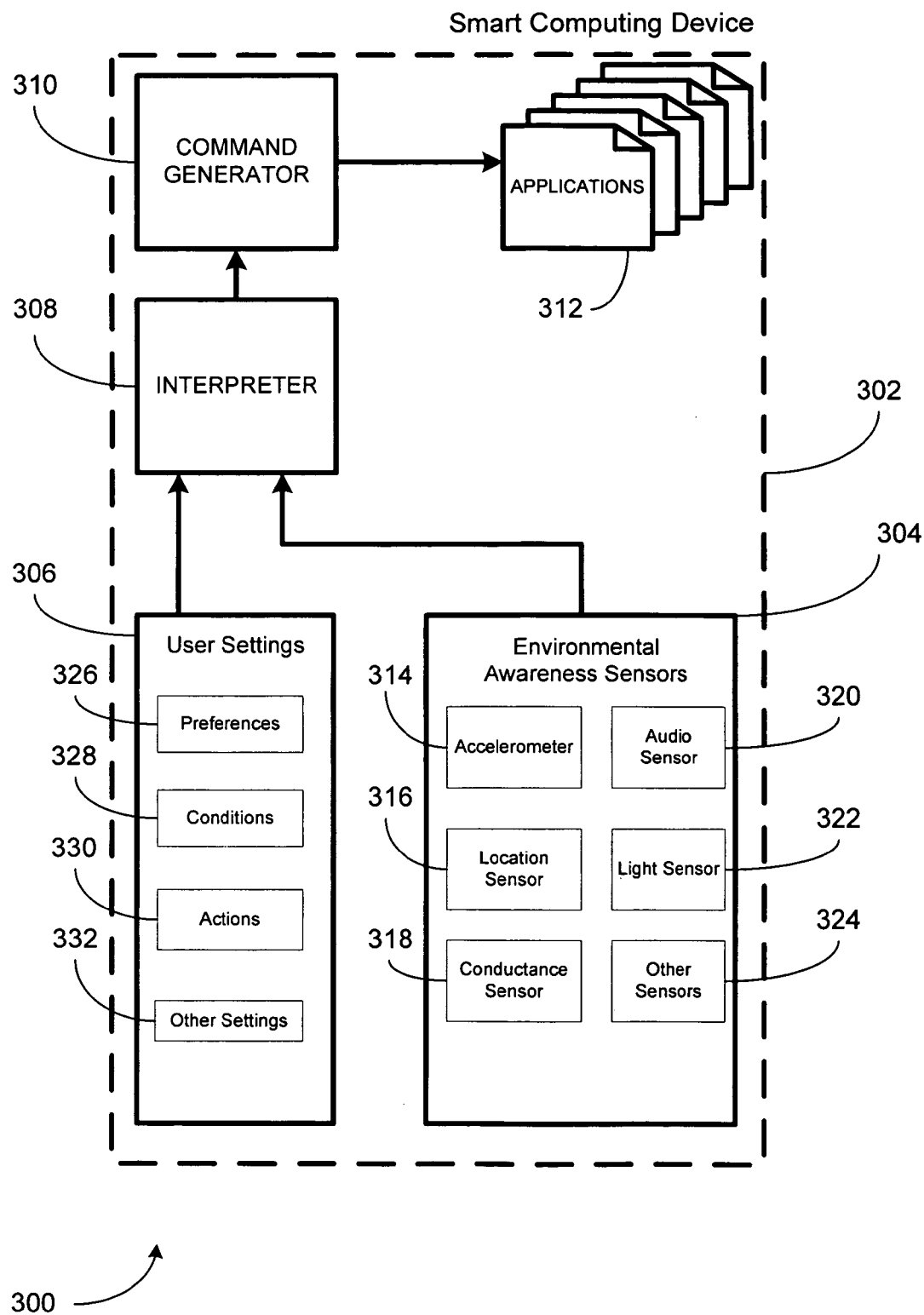
FIG. 3 represents one exemplary embodiment of a smart computing device that may be used in one embodiment of the present invention.

FIG. 3 represents one exemplary system 300 for interacting with a computing device using environmental awareness. System 300 represents a system overview of the present invention. System 300 may include various configurations without departing from the spirit and scope of the present invention. System 300 may be integrated as a combination of software and hardware elements, an operating system or any combination thereof. Hardware, databases, software or applications referenced herein may be integrated as a single element or include various elements in communication with one another. Software and hardware elements are depicted herein for explanatory purposes only and not for limiting the configuration to multiple elements or a single element performing several functions. For example, in FIG. 3, smart computing device 302 may include environmental awareness sensors 304, user settings 306, interpreter 308, command generator 310 and applications 312. Reference numbers 304-312 may include separate programs and hardware, a single program with integrated hardware or any combination thereof.

Figure 1:
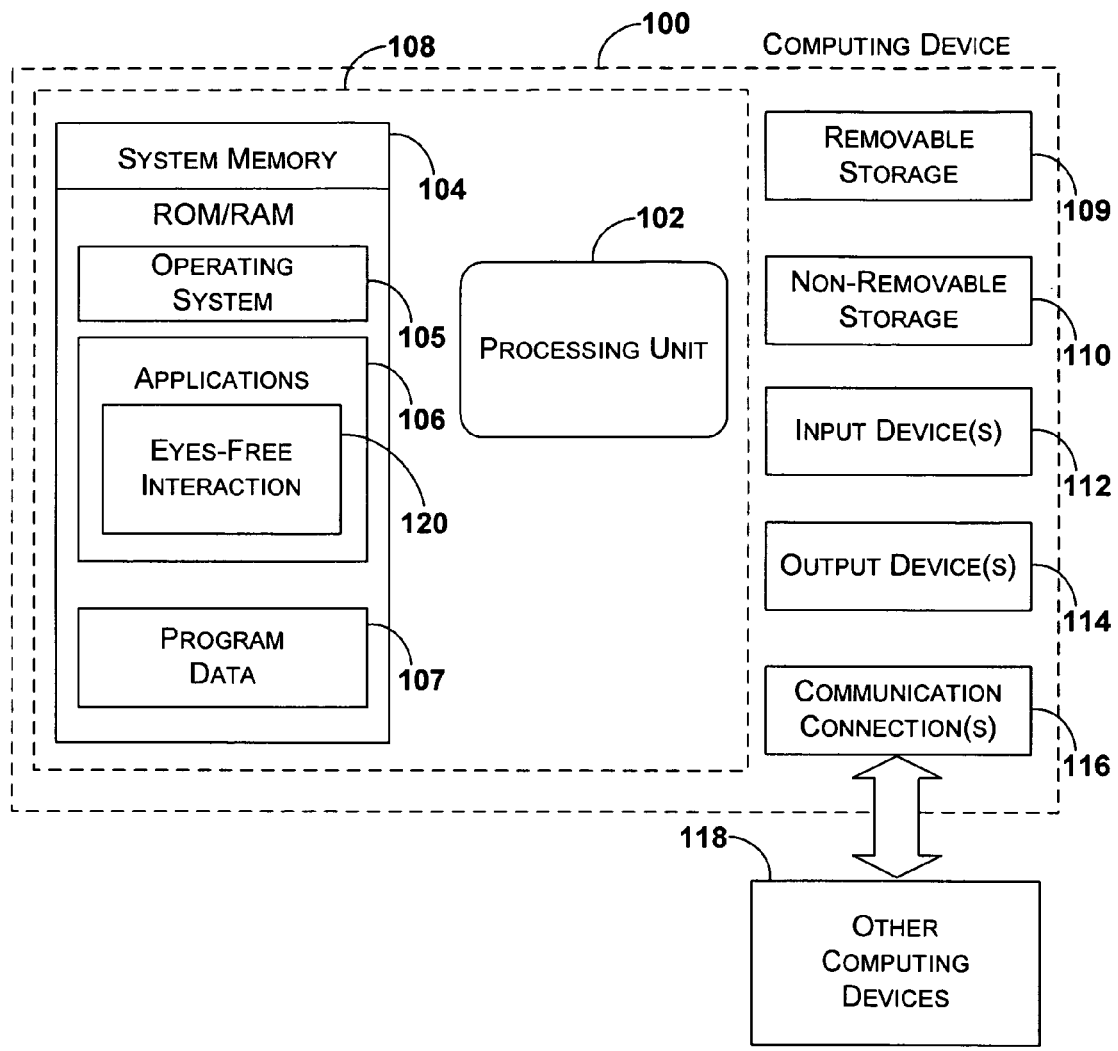
FIG. 1 illustrates an exemplary computing device that may be used in one aspect of the present invention.
Figure 2:
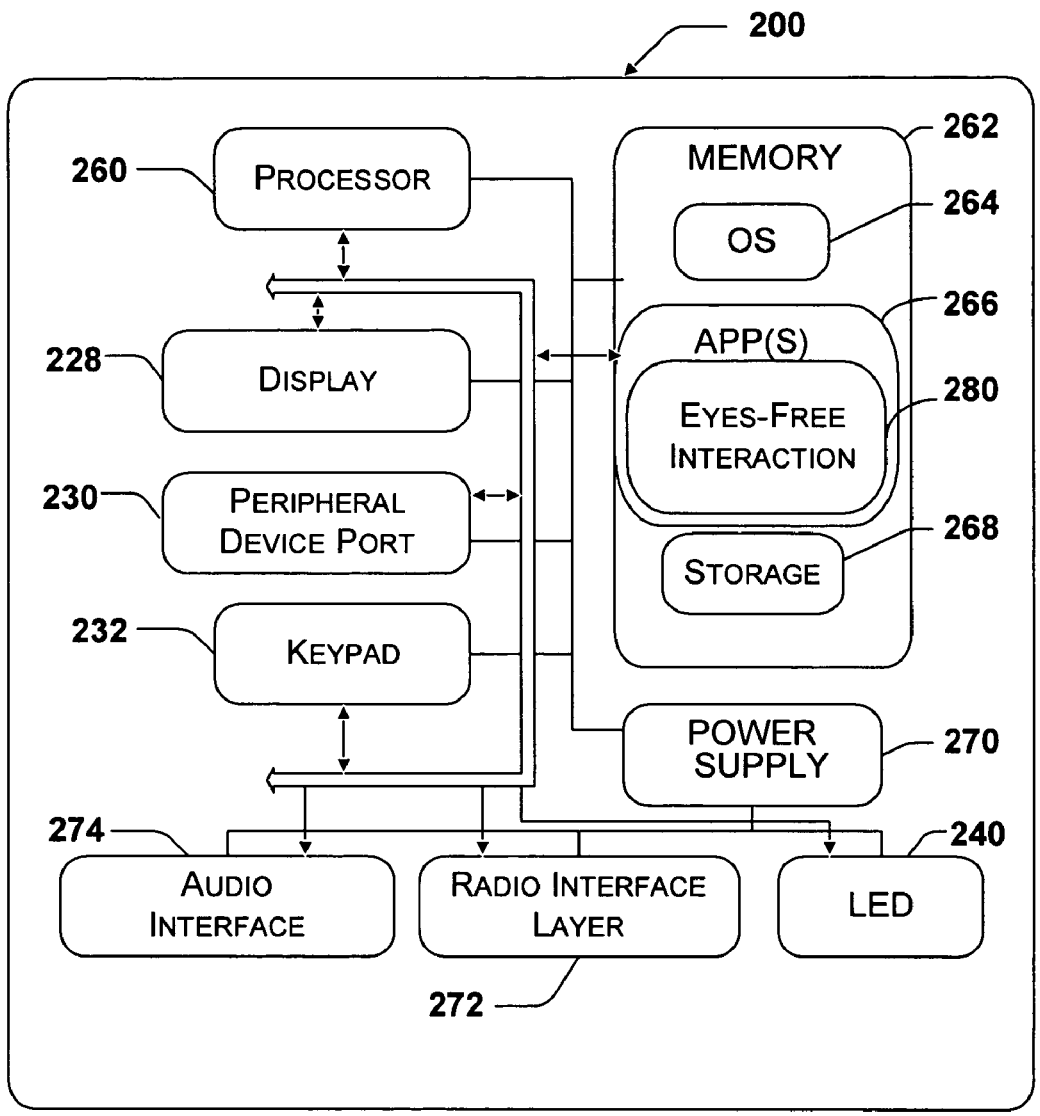
FIG. 2 illustrates an exemplary mobile device that may be used in one aspect of the present invention.

Smart computing device 302 may include computing device 100 as exemplified in FIG. 1 or smart computing device 302 may include mobile computing device 200 as exemplified in FIG. 2. Smart computing device 302 may include a telephone, cellular telephone, satellite telephone, pager, stationary computing device, mobile computing device, televising device, mobile audio device, watch device, or any other device that may implement environmental awareness to facilitate eyes-free interaction to execute commands.

Environmental awareness sensors 304 monitor current environmental conditions, which may give context to a non-environmental impact. The monitored conditions are sent to interpreter 308 and interpreter 308 interprets the environmental conditions in light of user settings 306. Succinctly stated, environmental awareness sensors 304 determine current environmental conditions, and user settings 306 identify what function a non-environmental impact instigates when a particular environmental condition is sensed. When the non-environmental impact is one that is identified in user settings 306, command generator 310 may generate a command to be executed on one or more applications 312.

Environmental awareness sensors 304 may include one or more sensors that facilitate the identification of a non-environmental impact (e.g. tapping) and provide context to the impact. Accelerometer 314 measures or identifies accelerations, vibrations and/or movements of smart computing device 302. For example, accelerometer 314 may identify that a user is walking, riding a bicycle, or on a train by identifying the rhythmic pattern of these activities. By identifying a rhythmic pattern, accelerometer 314 may also identify non-environmental impacts that vary from the rhythmic pattern of the activity. A non-environmental impact may include any type of impact that accelerometer 314 identifies as not being provided by the environment. For example, a non-environmental impact may include tapping the device, moving the device in a particular manner, holding the device, etc. For instance, accelerometer 314 may identify that the user is riding a bicycle by the repeated vibrations and movements that are indicative of riding a bicycle. Accelerometer 314 may not indicate that these vibrations and movements are non-environmental impacts because of the pattern. However, if a user taps smart computing device 302 while riding the bicycle, accelerometer 314 may send this information to interpreter 308 to determine what functionality the tap implicates. Interpreter 308 may include any type of probability algorithm, estimators or statistical calculators to determine the likelihood of environmental conditions and non-environmental impacts. In one embodiment, a Bayesian algorithm is utilized to determine probability.

Environmental awareness sensors 304 may also include location sensor 316. Location sensor 316 may identify the location of smart computing device 302. Location sensor 316 may include a Global Positioning Service ("GPS") sensor, a Wireless Fidelity ("Wi-Fi") sensor, or a Wireless Local Area Network ("Wireless LAN") sensor. Succinctly, stated, location sensor 316 may identify where smart computing device 302 is located and relay this information to interpreter 308 to determine if the location information provides context to user settings 306. For example, location sensor 316 may identify that the smart computing device 302 is in a meeting room. User settings 306 may indicate that smart computing device 302 is to be muted by a tap if the location is a meeting room. Accordingly, if an audio action occurs and a user taps the device, command generator 310 generates a mute command and sends it to applications 312. As another example, location sensor 316 may identify that smart computing device 302 is in a gym. User settings 306 may indicate that computing device 302 is to skip a music track by a single tap if the location is in a gym. Accordingly, if an application is playing music and a user taps the device, command generator 310 generates a skip track command for a music application.

Environmental awareness sensors 304 may also include conductance sensor 318. Conductance sensor 318 may identify touch. Stated another way, conductance sensor 318 may identify when a user is holding smart computing device 302. This information may be sent to interpreter 308 and interpreter 308 may identify non-environmental impacts for when smart computing device 302 is being held. For example, a single tap may answer an incoming telephone call in speaker mode and a double tap may send an incoming telephone call to voicemail. When user settings 306 are implicated, command generator 310 may generate a command for applications 312.

Environmental awareness sensors 304 may further include audio sensor 320. Succinctly stated, audio sensor 320 may identify noise or audio elements in the environment. Audio sensor 320 may provide further context to a non-environmental impact. As an example, a user may be driving in a car and have the radio playing loudly. Audio sensor 320 may identify the magnitude of volume and send this information to interpreter 308. Interpreter 308 may have received user settings 306 that indicate when the volume is above a magnitude, a single tap to the device increases the volume of the device one increment. When user settings 306 are implicated in such a manner, command generator 310 generates a command for applications 312.

Environmental awareness sensors 304 may further include light sensor 322. As an example, a user may be in a movie and light sensor 322 indicates that it is dark. Light sensor 322 may send this information to interpreter 308. User settings 306 may indicate that when it is dark, a single tap to smart computing device 302 turns the device off. When user settings 306 are implicated in such a manner, command generator 310 generates a command for applications 312.

Environmental awareness sensors 304 may include other sensors 324. Other sensors 324 may include a temperature sensor, heat sensor, smoke sensor, altitude sensor or any other type of sensor that may be useful to identify environmental conditions. For example, heat and smoke sensors may ultimately invoke command generator 310 to call the fire department or the police upon a non-environmental impact. Through a non-environmental impact, altitude sensors may ultimately invoke command generator 310 to shut smart computing device 302 off because the user is aboard an airplane.

Some aspects of the environmental awareness sensors 304 are to identify what the user is doing, where the user is located, and what environmental conditions exist. This information may then be used to determine whether a non-environmental impact has occurred and what function the non-environmental impact invokes. In one embodiment, accelerometer 314 is a primary environmental awareness sensor 304 and sensors 316-324 provide context to the non-environmental impact to determine what functionality is implicated.

User settings 306 may be default settings or settings that a user inputs to identify a command related to an environmental condition. User settings 306 may include preferences 326. Preferences 326 may include commands that are generated when environmental awareness sensors 304 indicate an environmental condition. For example, preferences 326 may indicate that when it is dark and smart computing device 302 is not moving, audio events are to be muted upon a non-environmental impact.

User settings 306 may also include conditions 328. Conditions 328 may include internal conditions of smart computing device 302. For example, where smart computing device 302 includes a telephone, an incoming telephone call may be a condition. As another example, conditions 328 may include scheduler events. A scheduler event may be a meeting or appointment logged into a calendar that identifies where the user is supposed to be located. Information in conditions 328 about where the user is supposed to be located may facilitate interpreter 308 in determining where the user actually is located. Succinctly stated, conditions 328 may identify conditions of smart computing device 302 and provide context to non-environmental impacts.

User settings 306 may also include actions 330. Actions 330 may include interactions with smart computing device 302 that indicate a non-environmental impact. For example, a user may set actions 330 to identify a single tap as having a first input significance, a double tap as having a second input significance, and a triple tap as having a third input significance. As stated above, tapping may be identified by accelerometer 314 as a disturbance in an environmental condition. User settings 306 may further include other settings 332. Other settings 332 may include any type of setting that facilitates the identification of a non-environmental impact and relates this information to a command for an application. User settings 306 may be associated with any application associated with smart computing device 302.

Interpreter 308 may receive user settings 306 and data from environmental awareness sensors 304. Interpreter 308 compares user settings 306 and data from environmental awareness sensors 304 to determine if a non-environmental impact has occurred. Interpreter 308 may include any type of probability algorithm, estimators or statistical calculators to determine the likelihood of environmental conditions and non-environmental impacts. In one embodiment, a Bayesian algorithm is utilized to determine probability. Command generator 310 generates a command in light of user settings 306 and information from environmental awareness sensors 304. The command is executed on applications 312.

Smart computing device 302 may include any combination of environmental awareness sensors 304, user settings 306 and applications 312. For example, smart computing device 302 may include a plurality of environmental awareness sensors 304 that monitor a plurality of environmental conditions. User settings 306 may include a plurality of different non-environmental impact types, which are activated depending on the particular environmental condition. User settings 306 may then implicate one or more applications 312 depending on the type of non-environmental impact. In this manner, a non-environmental impact (i.e. tapping) while riding a bicycle may invoke a different command and application than the same non-environmental impact while in a meeting. Likewise, a non-environmental impact while in a meeting may implicate a different command and application than the same non-environmental impact while in a movie. The combination of environmental awareness sensors 304, user settings, and applications 312 is endless and the examples herein are not meant to limit the breath or scope of the present invention.

As but one example for a use of system 300, a user may set preferences 326, conditions 328 and actions 330. A user may set user settings 306 so that when the user is in a meeting and the phone rings, a single tap to the phone silences the ringer and a double tap sends the phone call directly to voicemail.

When the user is in the meeting, accelerometer 314 may indicate that the phone is not moving and thereby imply that the user is sitting. Location sensor 316 may identify that the phone is in a particular room where the meeting is supposed to take place. Conductance sensor 318 may indicate that a user is not holding the phone. Audio sensor 320 may indicate that individuals are talking. Light sensor 322 may indicate the absence of light and thereby imply that the phone is in a pocket. Interpreter 308 receives this information and determines that the user is indeed in a meeting and non-environmental impact settings for a meeting are invoked.

If a phone call is received during the meeting and a user taps the phone, accelerometer 314 identifies the tap as a non-environmental impact. Interpreter 308 identifies the tap as relating to a mute function. Command generator 310 generates a command to silence the ringer of the phone. This command is then sent to the appropriate applications 312. In this manner, system 300 monitors the environment and provides the user a manner of interacting with smart computing device 302 by non-environmental impacts. Succinctly stated, this manner of interacting allows a user to interact with the smart computing device 302 in an eyes-free manner.

Figure 4:
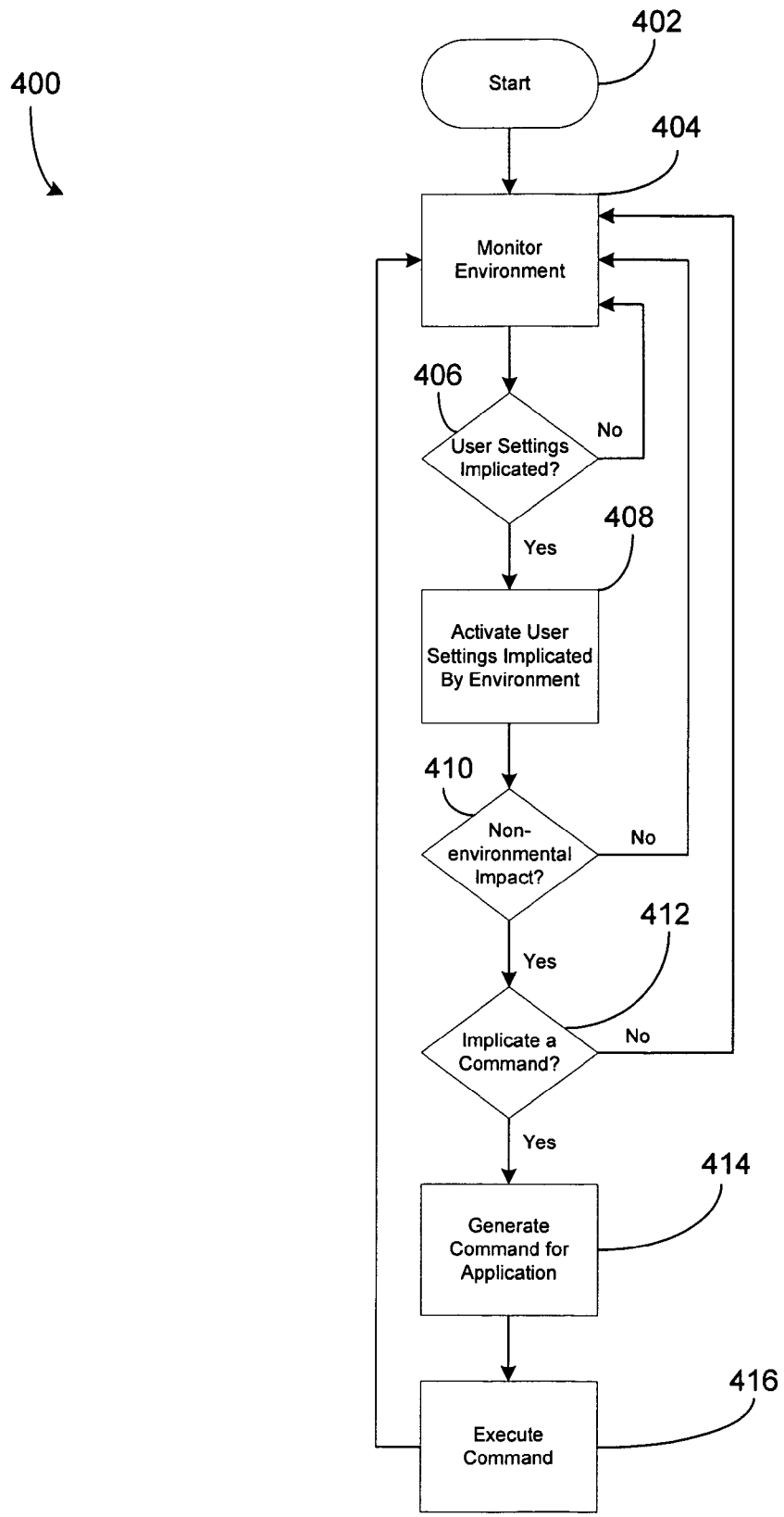
FIG. 4 represents an exemplary logical flow diagram of one embodiment of eyes-free interaction through environmental awareness.

FIG. 4 represents a logical flow diagram of one embodiment of eyes-free interaction with a mobile device through environmental awareness. Process 400 starts at starting block 402 and flows to block 404 where the environment is monitored. One or more environmental awareness sensors may be used to monitor the environment. In one embodiment, monitoring includes an accelerometer for monitoring accelerations, movements and/or vibrations. In this manner, the accelerometer may indicate non-environmental impact deviations, which may indicate a user input. In another embodiment, monitoring may include monitoring movements, location, conductance, audio, light, altitude, heat, air, smoke or any other type of environmental condition that may be useful to provide context to a non-environmental impact.

At block 406, process 400 determines whether a user setting is implicated by the current environmental condition. When a user setting is not implicated, process 400 returns to block 404, where the environment is monitored. When a user setting is implicated, process 400 flows to block 408.

At block 408, the user settings that are implicated by the environmental conditions are activated. For example, when the environmental conditions indicate that the user is riding a bicycle and listening to music, the activated user settings may include a single tap to the device as indicating that the user wishes to mute the music.

Once the user settings are activated, process 400 flows to block 410 where it is determined whether a non-environmental impact has occurred. To continue the above example, an environmental condition may include a smart computing device bouncing against the user as the user listens to music and rides the bicycle. A non-environmental impact may include the user tapping the smart computing device once. An accelerometer may identify the tap as a non-environmental impact and not as the device bouncing against the user. When a non-environmental impact does not occur, process 400 returns to block 404 where the environment is monitored. When a non-environmental impact does occur, process 400 continues to block 412.

At block 412, process 400 determines whether the non-environmental impact implicates a command for a particular application or applications. For example, if the user indicates that a single tap mutes the music, a single tap will implicate this command. Contrariwise, a double tap that has not been assigned as a non-environmental impact may not implicate a command. When a command is implicated, process 400 flows to block 414.

At block 414 the command is generated for the application and at block 416 the application executes the command. Continuing with the above example, a mute command may be generated and executed on a music player to mute the smart computing device. Once the command has been executed, process 400 flows back to block 404 where the environment is monitored.

Illustrative Operating Environment

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for eyes-free interaction. In another embodiment, operating system 105 includes eyes-free interaction. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for eyes-free interaction. In another embodiment, operating system 264 includes eyes-free interaction.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for interaction with a mobile device through environmental awareness, the method comprising:
   obtaining preferences on a mobile device, wherein the preferences indicate:
      a plurality of environmental context settings, wherein each of the plurality of environmental context settings identify a respective application of a plurality of applications of the mobile device to implicate when a respective environmental context external to the mobile device is detected by the mobile device, and
      a command of the respective application to execute in response to detecting the respective environmental context and in response to receiving a non-environmental impact;
   monitoring, by an environmental awareness sensor of the mobile device, environmental conditions, wherein the environmental conditions monitored comprise a location condition, a movement condition, an audio condition and a light condition;

determining when the monitoring by the environmental awareness sensor indicates a rhythmic pattern that indicates an activity and an occurrence of an environmental condition and when the monitoring by the environmental awareness indicates an occurrence of a non-environmental impact;

in response to determining the occurrence of the non-environmental impact:

interpreting the at least one environmental condition external to the mobile device detected by the environmental awareness sensor of the mobile device to determine a current environmental context external to the mobile device, matching the determined current environmental context external to the mobile device to an environmental context setting of the plurality of environmental context settings indicated in the preferences, based on the matching of the determined current environmental context external to the mobile device to the environmental context setting, implicating the respective application of the plurality of applications indicated in the preferences that is matched with the environmental context setting in the preferences, and executing the command of the respective application.

2. The computer-implemented method of claim 1, wherein the plurality of environmental context settings include at least one member of a group comprising: a detectable location, a detectable movement, a detectable conductance, a detectable audio, a detectable light level, a detectable temperature, a detectable heat level, a detectable smoke level, and a detectable altitude.

3. The computer-implemented method of claim 1, wherein the environmental awareness sensor includes at least one member of a group comprising: a location sensor, a movement sensor, a conductance sensor, an audio sensor, a light sensor, a temperature sensor, a heat sensor, a smoke sensor and an altitude sensor.

4. The computer-implemented method of claim 1, wherein the environmental condition external to the mobile device further comprises: a conductance condition, a temperature condition, a heat condition, a smoke condition, and an altitude condition.

5. The computer-implemented method of claim 1, wherein the non-environmental impact comprises any one of: a double tap impact, a triple tap impact, a movement, an acceleration, and a touch.

6. The computer-implemented method of claim 1,
wherein the preferences further indicate a plurality of respective application commands, wherein each of the plurality of respective application commands is implicated by a different non-environmental impact type,
wherein receiving a non-environmental impact further includes detecting a non-environmental impact type, and
wherein executing the command of the respective application further includes executing a command of the plurality of respective commands that is implicated by the non-environmental impact type.

7. The computer-implemented method of claim 1,
wherein the preferences further indicate condition settings, wherein the condition settings are internal scheduling events associated with the mobile device,
wherein matching the determined current environmental context external to the mobile device to the environmental context setting indicated in the preferences further includes matching current conditions associated with the internal scheduling events of the mobile device to condition settings associated with the preferences, and
wherein identifying the respective application of the plurality of applications indicated in the preferences further includes identifying the respective application of the plurality of applications indicated in the preferences that matches with the environmental context setting and indicated condition settings.

8. A computer-readable storage medium having computer executable instructions for interaction through environmental awareness, the instructions comprising:

obtaining user preferences on a mobile device, wherein the user preferences indicate:

a plurality of environmental context settings, wherein each of the plurality of environmental context settings identify a respective application of a plurality of applications of the mobile device to implicate when a respective environmental context external to the mobile device is detected by the mobile device, and a command of the respective application to execute in response to detecting the respective environmental context and in response to receiving a user tap input;

detecting a user tap input, wherein the user tap input is detected by:

monitoring, by an accelerometer, environmental impact patterns to the mobile device, and distinguishing a user tap input from the environmental impact patterns to the mobile device by determining when the monitoring by the accelerometer indicates a rhythmic pattern that indicates an activity and an occurrence of an environmental condition and when the monitoring by the accelerometer indicates an occurrence of the user tap;

in response to detecting the user tap input:

detecting, by an environmental awareness sensor of the mobile device, at least one environmental condition external to the mobile device, interpreting the at least one environmental condition external to the mobile device detected by the environmental awareness sensor of the mobile device to determine a current environmental context external to the mobile device, matching the determined current environmental context external to the mobile device to an environmental context setting of the plurality of environmental context settings indicated in the preferences, based on the matching of the determined current environmental context external to the mobile device to the environmental context setting, implicating the respective application of the plurality of applications indicated in the preferences that is matched with the environmental context setting in the preferences, and executing the command of the respective application.

9. The computer-readable storage medium of claim 8, wherein the plurality of environmental context settings include at least one member of a group comprising: a detectable location, a detectable movement, a detectable conductance, a detectable audio, a detectable light level, a detectable temperature, a detectable heat level, a detectable smoke level, and a detectable altitude.

10. The computer-readable storage medium of claim 8, wherein the environmental awareness sensor includes at least one member of a group comprising: a location sensor, a movement sensor, a conductance sensor, an audio sensor, a light sensor, a temperature sensor, a heat sensor, a smoke sensor and an altitude sensor.

11. The computer-readable storage medium of claim 8, wherein the environmental condition external to the mobile device includes at least one member of a group comprising: a location condition, a movement condition, a conductance condition, an audio condition, a light condition, a temperature condition, a heat condition, a smoke condition, and an altitude condition.

12. The computer-readable storage medium of claim 8, wherein the user tap input includes at least one member of a group comprising: a single tap impact, a double tap impact, and a triple tap impact.

13. The computer-readable storage medium of claim 8,
wherein the user preferences further indicate a plurality of respective application commands, wherein each of the plurality of respective application commands is implicated by a different user tap input,
wherein receiving a user tap input further includes detecting a user tap type, and
wherein executing the command of the respective application further includes executing a command of the plurality of respective commands that is implicated by the user tap type.

14. The computer-readable storage medium of claim 8,
wherein the preferences further indicate condition settings, wherein the condition settings are internal scheduling events associated with the mobile device,
wherein matching the determined current environmental context external to the mobile device to the environmental context setting indicated in the preferences further includes matching current conditions associated with the internal scheduling events of the mobile device to condition settings associated with the preferences, and
wherein identifying the respective application of the plurality of applications indicated in the preferences further includes identifying the respective application of the plurality of applications indicated in the preferences that matches with the environmental context setting and indicated condition settings.

15. A system for interaction through environmental awareness, the system comprising:
a processor; and
a memory having computer executable-instructions stored thereon, wherein the computer-executable instructions are configured for:
  obtaining preferences on a mobile device, wherein the preferences include:
    a plurality of environmental context settings, wherein each of the plurality of environmental context settings identify a respective application of a plurality of applications of the mobile device to implicate when a respective environmental context external to the mobile device is detected by the mobile device, and
    a plurality of respective application commands, wherein each of the plurality of respective application commands is executed in response to detecting the respective environmental context external to the mobile device and in response to receiving a non-environmental impact type;
  detecting a non-environmental impact type, wherein the non-environmental impact type is detected by:
    monitoring, by an accelerometer, environmental impact patterns to the mobile device,
    distinguishing a non-environmental impact from the environmental impact patterns to the mobile device by determining when the monitoring by the accelerometer indicates a rhythmic pattern that indicates an activity and an occurrence of an environmental impact and when the monitoring by the accelerometer indicates an occurrence of the non-environmental impact, and
    determining the non-environmental impact type of the non-environmental impact;
  in response to determining the non-environmental impact type:
    detecting, by an environmental awareness sensor of the mobile device, at least one environmental condition external to the mobile device,
    interpreting the at least one environmental condition external to the mobile device detected by the environmental awareness sensor of the mobile device to determine a current environmental context external to the mobile device,
    matching the determined current environmental context external to the mobile device to an environmental context setting of the plurality of environmental context settings indicated in the preferences,
    based on the matching of the determined current environmental context external to the mobile device to the environmental context setting, implicating the respective application of the plurality of applications indicated in the preferences that is matched with the environmental context setting in the preferences, and
    executing a command of the plurality of commands of the respective application that is implicated by the non-environmental impact type.

16. The system of claim 15, wherein the plurality of environmental context settings include at least one member of a group comprising: a detectable location, a detectable movement, a detectable conductance, a detectable audio, a detectable light level, a detectable temperature, a detectable heat level, a detectable smoke level, and a detectable altitude.

17. The system of claim 15, wherein the environmental awareness sensor includes at least one member of a group comprising: a location sensor, a movement sensor, a conductance sensor, an audio sensor, a light sensor, a temperature sensor, a heat sensor, a smoke sensor and an altitude sensor.

18. The system of claim 15, wherein the environmental condition external to the mobile device includes at least one member of a group comprising: a location condition, a movement condition, a conductance condition, an audio condition, a light condition, a temperature condition, a heat condition, a smoke condition, and an altitude condition.

19. The system of claim 15, wherein the non-environmental impact includes at least one member of a group comprising: a single tap impact, a double tap impact, a triple tap impact, a movement, an acceleration, and a touch.

20. The system of claim 15,
wherein the preferences further indicate condition settings, wherein the condition settings are internal scheduling events associated with the mobile device,
wherein matching the determined current environmental context external to the mobile device to the environmental context setting indicated in the preferences further includes matching current conditions associated with the internal scheduling events of the mobile device to condition settings associated with the preferences, and
wherein identifying the respective application of the plurality of applications indicated in the preferences further includes identifying the respective application of the plurality of applications indicated in the preferences that matches with the environmental context setting and indicated condition settings.

* * * * *